United States Patent Office 3,012,857
Patented Dec. 12, 1961

3,012,857
PREPARATION OF FIBROUS TITANIUM DIOXIDE
Donald C. Pease, Wilmington, Del., assignor to E. I. du Pont de Nemours and Company, Wilmington, Del., a corporation of Delaware
No Drawing. Filed Mar. 23, 1960, Ser. No. 16,975
12 Claims. (Cl. 23—202)

This invention relates to a method for preparing inorganic fibrous materials; more particularly, this invention relates to a method for preparing fibrous titanium dioxide.

Titanium dioxide is well known as a white pigment which is used extensively in the formulation of paints and in plastics and the like. In addition to the finely divided pigment forms of titanium dioxide, acicular forms, e.g., those which produce asterism in synthetic sapphires and rubies have also been described. Titanium dioxide also exists in a fibrous form, and because of the high refractoriness and reflectance for infrared radiation possessed by this fibrous product, it is particularly useful as a high temperature thermal insulator. Moreover, the fibrous nature and high flexural modulus of fibrous titanium dioxide make it useful as a reinforcing component of ceramics, cermets, and plastics, and in paper and other fiber compositions. Also, it is useful as a filtering medium, particularly in high-temperature applications. Because of these diverse uses, new methods for the preparation of this highly refractory fiber are desired.

This invention provides a process for the preparation of fibrous titanium dioxide by the oxidation of a titanium subhalide or mixtures of such halides in a molten salt. Oxidation is accomplished by merely contacting the molten salt containing the titanium subhalides with a source of oxygen; e.g., air or oxygen. Satisfactory contact between the titanium subhalide and the oxidizing agent can be obtained by passing the gaseous agent over the surface of, or bubbling it into, the molten reaction medium.

The titanium subhalides which are used in this invention are well known materials, and they are characterized as subhalides since the valence of the titanium in these halides is less than 4, the normal valence for titanium. Titanium subhalides are most often available as mixtures of titanium trihalide and titanium dihalide, and the composition of such mixtures is usually expressed as the average of the halide atoms present in the subhalide per atom of combined titanium. For example, a mixture containing 1 mol of titanium trichloride and 1 mol of titanium dichloride is referred to as $TiCl_{2.5}$. The titanium subhalides suitable for use in this invention are those in which the ratio of halide atoms to titanium atoms is in the range of 3:1 to 2:1, inclusive. Solutions of such titanium subhalides in molten salts are also well known. The alkalinous metal salts, including both the alkali metal halides and the alkaline earth metal halides, have been used as the dissolving medium. For example, U.S. Patent 2,920,952 discloses titanium subhalide-alkalinous metal halide salt compositions which may be used in this invention. Other U.S. patents which disclose similar compositions include 2,706,153, 2,765,270, 2,835,568, 2,845,341 and 2,856,335. It will be noted from the cited patent that such titanium subhalide-alkalinous metal halides have previously been used in a reduction reaction for the production of titanium metal. In contrast to this, the present invention utilizes such compositions in a reaction with oxygen wherein lower-valent titanium is converted to the tetravalent state. The preferred titanium subhalides for use in this process are the subchlorides, although subfluorides, subbromides, and subiodides may be employed, if desired, especially in mixtures with the subchlorides. In instances where titanium subfluorides are used, the molten alkalinous metal halide should be composed, at least in part, of an anfluoridous halide (a halide other than a fluoride, i.e., a halogen possessing an atomic number greater than 9). If a maximum amount of titanium dioxide is to be produced, there should be present an amount of anfluoridous halide which will provide at least an atomic equivalent of anfluoridous halogen for each atomic equivalent of fluorine present in the titanium subfluoride.

The reaction medium employed in this process may be an individual metal salt, e.g., sodium chloride, or a mixture of alkalinous metal salts which is molten at the desired operating temperature. The presence of metal fluorides in the melts is highly desirable since long fibers are produced in such melts. Suitable melt constituents are lithium chloride, lithium fluoride, potassium chloride, potassium fluoride, sodium fluoride, sodium chloride, sodium bromide, sodium iodide, calcium chloride, barium chloride, magnesium chloride, and the like. Zinc chloride and cadmium chloride may also be present, if desired.

The temperature at which this process is carried out must be sufficient to maintain the reaction medium in molten condition. Excessively high temperatures are to be avoided, however, because they promote undesirable side reactions, because of practical difficulties in securing suitable materials for construction of equipment, and because of the additional expense involved in maintaining such temperatures. Temperatures of about 550–1000° C. and higher are operable, but temperatures of 600–900° C. are usually employed. Fibers exhibiting high axial ratios and other desirable properties are produced at temperatures in the range of 600–800° C.

The process of this invention is usually carried out at atmospheric pressure and provision of equipment capable of withstanding pressures greatly in excess of atmospheric pressure is unnecessary. Operation at pressures slightly above atmospheric pressure is sometimes beneficial, e.g., to prevent access of moisture from the atmosphere. It is also possible to operate at reduced pressures. The pressure employed will usually be between 0.5 and 5 atmospheres.

The oxidation of titanium subhalides is generally carried out with gaseous oxygen or air as the oxidizing agent in a quantity sufficient to convert all the titanium subhalide to titanium dioxide, i.e., at least two atomic proportions of oxygen for each atomic proportion of titanium. To insure complete reaction, an excess of oxidizing agent is usually desirable. There is nothing critical in the manner of supplying the necessary oxygen to the reaction system. It is simply a matter of introducing air or oxygen into the system until the fibrous $TiO_2$ is produced. To obtain highest yields of fibrous titanium dioxide, the air or oxygen should be anhydrous since the presence of moisture leads to formation of non-fibrous titanium dioxide by hydrolysis of the titanium subhalide. Minor proportions of moisture can, however, be tolerated.

The time of reaction is not critical and may be varied within wide limits depending upon the amounts of titanium subhalide to be converted. In the examples below, times ranging from a few hours to several days are illustrated.

The process of this invention is conveniently carried out by introducing the titanium subhalide-alkalinous metal halide salt composition into a suitable vessel and then heating to reaction temperature. When the desired temperature has been reached, introduction of the oxidizing agent is commenced and the formation of titanium dioxide fibers begins in the region of contact between the oxidizing agent and the molten salt containing the titanium subhalide. At the completion of the reaction period, the melt is cooled to approximately room temperature and treated with water to dissolve the reaction medium leaving the fibrous titanium dioxide suspended. Alternatively, the metal halide melt can be separated at elevated temperature from the titanium dioxide fibers by decantation or filtration. This method conserves heat energy since the melt is maintained at approximately reaction temperature and can be used directly for the conversion of further quantities of titanium subhalide. It is desirable to wash the titanium dioxide fibers so obtained with water to remove any water-soluble melt constituents which may be adhering to their surfaces.

The titanium dioxide fibers in aqueous suspension are readily separated from any non-fibrous material inadvertently produced by filtration, screening, elutriation, settling, decantation, and the like.

For a clearer understanding of the invention, the following specific examples are given. These examples are intended to be merely illustrative of the invention and not in limitation thereof. Unless otherwise specified, all parts are by weight.

EXAMPLE I

A test tube of fused silica approximately 10.5" in length by 2.4" in outside diameter, having a standard taper joint at its open end, was flushed with dry nitrogen and loaded with a mixture of alkali metal chlorides, previously dried by fusion, consisting of 208 g. of potassium chloride and 134 g. of sodium chloride. There was also introduced 75 g. of a solid consisting of sodium chloride and titanium subchloride (average composition $TiCl_{2.5}$) in the weight ratio of 47:53. The silica test tube was closed with a tight-fitting cap equipped with a thermocouple well and gas inlet and outlet connections.

The tube was heated to melt the contents and the heater adjusted to maintain a temperature in the range of 715–740° C. as measured by a thermocouple in the well described above. Dry air at a rate of 30 cc./min. was introduced through the gas inlet tube and contacted with the surface of the melt for a period of 454 hours. At the end of the reaction period, the mixture was cooled, and treated with water to remove soluble materials.

There was thus obtained 16.7 g. of titanium dioxide which was well stirred in two liters of water, allowed to settle partially for a few seconds and the upper two-thirds of the slurry decanted. This procedure was repeated three times to effect the separation of the titanium dioxide fibers from coarse non-fibrous by-products. The decanted suspension was poured on a 200-mesh screen which was then vibrated for about 10 minutes below the surface of a vessel of water. Crystalline fibers of about 1 mm. in length remained on the screen and finer fibers passed through. By examination at a magnification of about 20X it was found that approximately 4% by weight of the titanium dioxide isolated was in the form of fibers approximately 0.5–1 mm. long and about 12% was in the range of 0.2–0.5 mm. long. Both types of fiber were about 1 micron in diameter.

EXAMPLE II

A quartz reaction tube having a center section approximately 15" long and 60 mm. in diameter and end sections about 8" long and 45 mm. in diameter was mounted horizontally with the middle section centered in a furnace about 18" in length. The tube was flushed with dry nitrogen and a reaction mixture consisting of 167 g. of potassium chloride, 78 g. of sodium chloride (both of which had been dried by fusion), 10 g. of titanium metal (dried by heating in vacuum at 500° C. for 6 hours) and 55 g. of the sodium chloride-titanium subchloride ($TiCl_{2.5}$) mixture, described in Example I, was introduced into the center section. The reaction mixture was maintained under dry nitrogen while it was heated to a temperature of about 700° C. A mixture of dry nitrogen (5–15 cc./min.) and dry oxygen (30–60 cc./min.) was then passed through the tube for a period of 88 hours. Exit gases were bubbled through a layer of sulfuric acid of sufficient depth to maintain a pressure of approximately 1.26 atmospheres in the reaction tube. After the reaction period, the titanium dioxide produced was separated from the cooled reaction mixture as described in Example I.

The product consisted of 29.5 g. of titanium dioxide which amounts to 88% of the theoretical yield based on the total titanium available as both titanium subchloride and titanium metal. About 12% of the product was in the form of fibers 0.2–0.5 mm. in length and approximately 1% in the form of fibers 0.5–1 mm. in length. The diameters of both types of fiber were below 5 microns. Some coarser crystals up to 3 mm. in length were also observed. The fibers were identified as rutile-type titanium dioxide from their X-ray diffraction pattern.

EXAMPLE III

A reaction tube similar to that described in Example II was loaded with a reaction mixture consisting of 140 g. of potassium chloride, 90 g. of sodium chloride, and 23 g. of commercial titanium trichloride. The reaction mixture was heated under nitrogen to 350° C. and maintained at this temperature for 0.5 hour. The temperature was then raised as rapidly as possible to 700° C. and as soon as the reaction mixture became molten, a mixture of oxygen (14 cc./min.) and nitrogen (8 cc./min.) was passed over the melt. The temperature of 700° C. and the passage of the oxygen/nitrogen mixture was maintained for a period of 66.6 hours during which time by-product chlorine was detected in the exit gas. After cooling, the reaction mixture was extracted with water and worked up as described in Example I. Titanium dioxide fibers less than 1 micron in diameter and 0.5–1 mm. in length were produced.

EXAMPLE IV

A reaction tube like that described in Example II was loaded in an inert atmosphere with 205 g. of dry potassium chloride, 105 g. of dry sodium chloride, and 55 g. of a composition containing sodium chloride and titanium subchloride ($TiCl_{2.15}$) in the weight ratio of 46:54. The reaction mixture was melted under nitrogen and held at a temperature of 720° C. for a period of 31.8 hours while oxygen at a rate of 10 cc./min. was passed over the surface of the melt. The product, isolated as described in Example I, consisted of 11 g. of titanium dioxide of which approximately 25% was in the form of fibers having diameters below 5 microns. Of these fibers, 40% were 1–2 mm. in length and 60% were 0.5–1 mm. in length.

EXAMPLE V

A mixture of potassium chloride, sodium chloride, sodium fluoride, and titanium subchloride containing the reactants $KCl:NaCl:NaF:TiCl_{2.15}$ in the proportions 53:23.4:13.6:10.0 was prepared in an alumina crucible under an inert atmosphere. The crucible was covered and placed in a muffle furnace maintained at 755° C. As soon as the crucible contents had melted, the cover was removed from the crucible and the reaction mixture exposed to the atmosphere in the furnace at 755° C. for 24 hours. Titanium dioxide fibers having lengths ranging from 0.5–2.5 mm. and diameters in the range of 0.7–8 microns were produced. Approximately 10% of the fibers ranged from 2–2.5 mm. in length, 45% ranged from 1–2 mm. in length, and the remaining 45% ranged from 0.5–1 mm. in length.

EXAMPLES VI–XI

These examples were carried out using apparatus similar to that described in Example II. Details of the reaction mixture, temperature, time of heating, and rate of flow of oxygen are shown in the table which follows. This table also shows the amount of titanium dioxide produced and the proportion obtained in the form of fibers of various lengths.

thereof quickly settle while the fibers remain in suspension and are readily decanted. When the decanted suspension is again allowed to stand, the fibrous material flocculates and entangles with the result that the preferred fibrous product undergoes accelerated sedimentation. This product can be readily isolated by decanting the suspending phase which now contains any fine non-fibrous particles inadvertently produced.

Table
PREPARATION OF FIBROUS TITANIUM DIOXIDE

| Example | Reaction Mixture (g.) | | Reaction Conditions | | | $TiO_2$ Produced (g.) | Fibers below 5 microns Diameter (wt. percent of $TiO_2$ prod.) | |
|---|---|---|---|---|---|---|---|---|
| | | | Temp. (° C.) | Time (hr.) | Oxygen Flow (cc./min.) | | 1–3 mm. long | 0.5–1 mm. long |
| VI | KCl<br>NaCl<br>$ZrCl_4$<br>$TiCl_{2.15}$ | 202<br>134<br>4<br>29.5 | 695 | 42.5 | 10 | 12.5 | 1.4 | [1] 0.9 |
| VII | KCl<br>NaCl<br>LiCl<br>$TiCl_{2.15}$ | 160<br>130<br>46<br>29.5 | 690 | 45.5 | 29 | 9.5 | | 4 |
| VIII | KCl<br>NaCl<br>$BaCl_2$<br>$TiCl_{2.15}$ | 155<br>126<br>40<br>29.5 | 690 | 41 | 29 | 12 | 1.7 | 3 |
| IX | KCl<br>NaCl<br>Si (pwd.)<br>$TiCl_{2.15}$ | 202<br>134<br>2<br>29.5 | 690 | 66.5 | 29 | 12.8 | 5 | 10 |
| X | KCl<br>NaCl<br>$MnCl_2$<br>$TiCl_{2.5}$ | 194<br>134<br>2<br>29.5 | 700 | 65 | 14.5 | 9 | | 10 |
| XI | NaCl<br>$TiCl_{2.5}$ | 108<br>117 | 810 | 18.5 | 25–90 | 37 | | 1 |

[1] Some fibrous material 5 mm. long and 1 micron in diameter was present.

In carrying out the process of this invention, the titanium subhalide is dissolved in the salt melt and it is preferred that the subhalide be present in an amount which does not exceed its solubility limit in the melt. Particularly useful systems are obtained by the reduction of titanium tetrahalide with a metal, e.g., an alkali metal, and contain titanium subhalide and metal halide in such proportion that the ratio of titanium to total halogen is about 1:4.

If desired, elemental titanium may be present in the molten salt reaction medium. Such elemental titanium can serve as a source of titanium subhalide by reaction with halogen produced as a by-product of the fiber-forming reaction. In instances where the subhalides are produced by the reduction of a titanium tetrahalide with elemental titanium, minor amounts of the latter will probably be present in the titanium subhalide product used in this invention.

The titanium dioxide fibers produced by the process of this invention have a fiber cross-section of less than 25 microns, preferably less than 5 microns, and an axial ratio, i.e., ratio of length to cross-sectional dimension, of at least 10:1. Preferred fibers have an axial ratio in excess of 100:1 and products with ratios as high as 500:1 or more can be prepared by this process. For the most part, the length of the fibers ranges from 0.2 mm. to 5 mm. or more. The atomic arrangement of these fibers is predominantly of the rutile type. Individual fibers are colorless, but when matted together the fibers appear white.

Mats or felts can be produced from aqueous suspensions of the fibers by filtration as, for example, through a Fourdrinier screen. The most coherent and flexible mats are produced by filtration of suspensions of the finest fibers having the greatest ratios of axial dimensions. When dilute suspensions, i.e., suspensions containing about 1% solids or less, are agitated vigorously and then allowed to stand, any large particles having the normal non-fibrous habit or thick needle forms or aggregates The properties, e.g., stiffness, density and porosity of fiber mats, can be varied considerably by the relative amounts of coarse and fine titanium dioxide particles permitted to remain with the fibers during the separation process. Thus, in effect, fibrous rutile can be used as a binder for other forms of titanium dioxide. Other fillers and extenders such as silica, carbon, asbestos, and the like can also be introduced to provide additional desirable properties. The bulk density and other properties of the fiber mats can be varied by choice of fiber characteristics and by the conditions of pressure, temperature, suspension, concentration, and the like under which the suspending medium is separated from the fibers. Although water is the most useful and economical suspending medium, other liquids such as alcohols, hydrocarbons, and other organic compounds can be used. When desired, the properties of these suspensions can be modified by the addition of dispersing agents and binders such as organic resins, sodium silicate, colloidal alumina, or silica.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for the production of fibrous titanium dioxide comprising contacting oxygen with molten alkalinous metal halide having dissolved therein at least one titanium subhalide, the halogen of said subhalide having an atomic number greater than 9.

2. A process for the production of fibrous titanium dioxide comprising contacting oxygen with molten alkalinous metal halide having dissolved therein at least one titanium subchloride.

3. The process of claim 2 wherein the alkalinous metal halide is alkali metal halide.

4. A process for the production of fibrous titanium dioxide comprising contacting oxygen with molten alkalinous metal fluoride having dissolved therein at least one titanium subchloride.

5. The process of claim 4 wherein the alkalinous metal fluoride is alkali metal fluoride.

6. A process for the production of fibrous titanium dioxide comprising contacting oxygen with a molten alkalinous metal halide selected from the group consisting of the chloride, the bromide, and the iodide of said alkalinous metal and having dissolved therein at least one titanium subfluoride.

7. The process of claim 6 wherein the alkalinous metal halide is alkali metal chloride.

8. A process for the production of fibrous titanium dioxide comprising contacting oxygen with molten alkalinous metal halide in the presence of elemental titanium, said alkalinous metal halide having dissolved therein at least one titanium subhalide, the halogen of said subhalide having an atomic number greater than 9.

9. The process of claim 8 wherein the alkalinous metal halide is alkali metal halide and the titanium subhalide is titanium subchloride.

10. A process for the production of fibrous titanium dioxide comprising contacting oxygen with molten alkalinous metal halide selected from the group consisting of the chloride, the bromide, and the iodide of said alkalinous metal and having dissolved therein at least one titanium subfluoride, said contacting being conducted in the presence of elemental titanium.

11. The process of claim 10 wherein the alkalinous metal halide is alkali metal chloride.

12. A process for the production of fibrous titanium dioxide comprising contacting oxygen with a molten alkalinous metal halide having dissolved therein at least 1 titanium subhalide and when said titanium subhalide is a titanium subfluoride, at least a portion of the alkalinous metal halide is selected from the group consisting of the chloride, the bromide, and the iodide of said alkalinous metal.

References Cited in the file of this patent

FOREIGN PATENTS 535,213     Great Britain _____ Apr. 2, 1941

OTHER REFERENCES

"Encyclopedia of Chemical Reactions," Jacobson, vol. 7, 1958, page 409.

Ser. No. 292,742, Beck et al. (A.P.C.), published July 13, 1943.